(12) United States Patent
Matsumura et al.

(10) Patent No.: US 10,153,493 B2
(45) Date of Patent: Dec. 11, 2018

(54) NONAQUEOUS ELECTROLYTE SECONDARY BATTERY

(71) Applicant: SHIN-ETSU CHEMICAL CO., LTD., Tokyo (JP)

(72) Inventors: Kazuyuki Matsumura, Annaka (JP); Tetsuo Nakanishi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/445,495

(22) Filed: Feb. 28, 2017

(65) Prior Publication Data

US 2017/0170482 A1   Jun. 15, 2017

Related U.S. Application Data

(62) Division of application No. 14/313,416, filed on Jun. 24, 2014.

(30) Foreign Application Priority Data

Jul. 5, 2013 (JP) .................. 2013-141591

(51) Int. Cl.
| | | |
|---|---|---|
| *H01M 10/0525* | (2010.01) | |
| *H01M 4/62* | (2006.01) | |
| *H01M 4/04* | (2006.01) | |
| *C01B 33/18* | (2006.01) | |
| *H01M 4/02* | (2006.01) | |

(52) U.S. Cl.
CPC ............ *H01M 4/628* (2013.01); *C01B 33/18* (2013.01); *H01M 4/049* (2013.01); *H01M 10/0525* (2013.01); *C01P 2004/32* (2013.01); *C01P 2004/51* (2013.01); *C01P 2004/61* (2013.01); *C01P 2004/62* (2013.01); *C01P 2004/64* (2013.01); *H01M 2004/021* (2013.01); *H01M 2300/0068* (2013.01)

(58) Field of Classification Search
CPC ..... C01B 33/18; H01M 10/0525; H01M 4/62; H01M 4/049; H01M 2004/021; H01M 2300/0068; C01P 2004/64; C01P 2004/62; C01P 2004/61; C01P 2004/51; C01P 2004/32
See application file for complete search history.

(56) References Cited

U.S. PATENT DOCUMENTS

| | | |
|---|---|---|
| 5,571,638 A | 11/1996 | Satoh et al. |
| 6,387,565 B1 | 5/2002 | Aihara et al. |
| 6,818,353 B2 | 11/2004 | Mori et al. |
| 2008/0118836 A1 | 5/2008 | Hwang et al. |
| 2010/0015523 A1 | 1/2010 | Ryu et al. |
| 2014/0248525 A1 | 9/2014 | Iwai et al. |

FOREIGN PATENT DOCUMENTS

| | | | |
|---|---|---|---|
| JP | 2001-93498 A | | 4/2001 |
| JP | 2002-15728 A | | 1/2002 |
| JP | 2011032114 | * | 2/2011 |
| JP | 5160544 B2 | | 3/2013 |
| KR | 1995-0002099 A | | 1/1995 |
| WO | WO 2008/023890 A | | 2/2008 |

OTHER PUBLICATIONS

JP2011032114 MT.*
U.S. Appl. No. 14/313,415, filed Jun. 24, 2014.

* cited by examiner

*Primary Examiner* — Alexander Usyatinsky
(74) *Attorney, Agent, or Firm* — Birch, Stewart, Kolasch & Birch, LLP

(57) ABSTRACT

A secondary battery comprising a positive electrode, a negative electrode, a separator, and a nonaqueous electrolyte is provided. The electrode material of which the positive and/or negative electrode is made contains hydrophobic spherical silica particles, which are obtained by introducing $R^1SiO_{3/2}$ units on surfaces of hydrophilic spherical silica particles of $SiO_2$ units, and further introducing $R^2_3SiO_{1/2}$ units on the surfaces, and have an average particle size of 5-1,000 nm, a particle size distribution $D_{90}/D_{10}$ of 2-3, and an average circularity of 0.8-1. All components of the battery are made hydrophobic for suppressing absorption of water within the battery and entry of water into the battery.

6 Claims, No Drawings

NONAQUEOUS ELECTROLYTE SECONDARY BATTERY

CROSS-REFERENCE TO RELATED APPLICATION

This application is a divisional of U.S. patent application Ser. No. 14/313,416 filed on Jun. 24, 2014 (now abandoned), which claims priority under 35 U.S.C. § 119(a) to Patent Application No. 2013-141591 filed in Japan on Jul. 5, 2013, the entire contents of which are hereby incorporated by reference.

TECHNICAL FIELD

This invention relates to a nonaqueous electrolyte secondary battery comprising hydrophobic spherical silica particles.

BACKGROUND ART

In conjunction with the technical advance and increasing demand of mobile tools, the demand for nonaqueous electrolyte secondary batteries as the energy source is in rapid growth. Among others, research works are focused on lithium secondary batteries because of their high energy density and high discharge voltage.

In general, the nonaqueous electrolyte secondary battery is constructed of a positive electrode, a negative electrode, and a separator interposed therebetween. Such a secondary battery has the problem that if the water content inside the battery increases, the electrolyte is degraded thereby to generate acid. The acid thus formed promotes side reactions, for example, degradation of solid electrolyte interface at the negative electrode, and dissolution of positive electrode active material. There eventually arise problems like a lowering of battery capacity and an increase of internal resistance.

In this regard, Patent Document 1 discloses the technique of admixing hydrophobized inorganic powder into the separator. Generally the separator material itself is hydrophobic. Thus this technique of imparting hydrophobicity to the separator material is not necessary insofar as no hydrophilic inorganic substance is further added to the separator material.

Patent Document 2 discloses the technique of coating an electrode material to an electrode current collector, and forming a layer of hydrophobic material on the surface of the electrode, for thereby preventing water from penetrating into the electrode material. With this technique, after the electrode material is coated onto the electrode current collector, the hydrophobic material is coated on the surface of the electrode material to form a layer which is effective for preventing water penetration. Accordingly, while water can be absorbed in or enter the electrode material during the preparation or coating of the electrode material, it is substantially impossible to evaporate off this water because of the overlying hydrophobic material layer.

Patent Document 3 proposes the technique of removing water contained in electrode material. An electrode material is coated onto an electrode current collector and then sintered. With this technique, however, various additives to construct the electrode material, for example, binder can undergo decomposition reaction during sintering. Accordingly, it is not preferable to apply this technique to the battery manufacture.

Patent Document 4 discloses addition of hydrophobic inactive particles to the electrode material itself. The hydrophobizing method is by treating ordinary hydrophilic inorganic oxide with a hydrophobic substance (e.g., hydrophobic silane compound) while the particle size and shape of the resulting hydrophobic inert particles are not specified. A simple mixture of the hydrophobic inactive particles (in Patent Document 4) with the electrode material is difficult to efficiently inhibit water entry or water-aided side reactions because the inorganic oxide particles are poorly dispersible. Even when entry of water from the exterior is prevented, it is difficult to effectively remove water and moisture from within the electrode material.

CITATION LIST

Patent Document 1: JP-A 2001-093498
Patent Document 2: JP-A 2002-015728
Patent Document 3: KR 1995-0002099
Patent Document 4: JP 5160544 (WO 2008/023890)

SUMMARY OF INVENTION

An object of the invention is to provide a nonaqueous electrolyte secondary battery wherein hydrophobicity is exerted over all components of the battery for inhibiting absorption and entry of water in the battery.

The invention pertains to a nonaqueous electrolyte secondary battery comprising a positive electrode, a negative electrode, a separator, and a nonaqueous electrolyte. The inventors have found that when hydrophobic spherical silica particles which have been treated by a specific method so as to be hydrophobic and have a specific average particle size, particle size distribution, and average circularity are incorporated into the electrode material of which the positive and/or negative electrode is made, the particles are effective for inhibiting absorption and entry of water in the battery, particularly during the battery manufacture. By virtue of this inhibitory effect, the battery is improved in high-temperature storage characteristics.

In one aspect, the invention provides a nonaqueous electrolyte secondary battery comprising a positive electrode, a negative electrode, a separator interposed between the positive and negative electrodes, and a nonaqueous electrolyte. The positive and/or negative electrode is made of an electrode material containing hydrophobic spherical silica particles. The hydrophobic spherical silica particles are introduced $R^1SiO_{3/2}$ units wherein $R^1$ is a substituted or unsubstituted monovalent hydrocarbon group of 1 to 20 carbon atoms on surfaces of hydrophilic spherical silica particles consisting essentially of $SiO_2$ units, and further introduced $R^2_3SiO_{1/2}$ units wherein $R^2$ is independently a substituted or unsubstituted monovalent hydrocarbon group of 1 to 6 carbon atoms on the surfaces having units introduced therein. The spherical silica particles have an average particle size of 5 nm to 1.00 μm, a particle size distribution $D_{90}/D_{10}$ of up to 3, and an average circularity of 0.8 to 1.

In a preferred embodiment, the hydrophobic spherical silica particles are obtained through the steps of (A1) subjecting a tetrafunctional silane compound, a partial hydrolytic condensate thereof or a combination thereof to hydrolysis and condensation to form hydrophilic spherical silica particles consisting essentially of $SiO_2$ units, (A2) introducing $R^1SiO_{3/2}$ units wherein $R^1$ is as defined above on surfaces of the hydrophilic spherical silica particles, and (A3) further introducing $R^2_3SiO_{1/2}$ units wherein $R^2$ is as defined above on the surfaces having $R^1SiO_{3/2}$ units introduced thereon.

In a more preferred embodiment, the hydrophobic spherical silica particles are obtained through the steps of (A1) forming hydrophilic spherical silica particles, (A2) first hydrophobic surface treatment with trifunctional silane compound, and (A3) second hydrophobic surface treatment with monofunctional silane compound. The step (A1) of forming hydrophilic spherical silica particles includes subjecting a tetrafunctional silane compound having the general formula (I):

$$Si(OR^3)_4 \tag{I}$$

wherein $R^3$ is each independently a monovalent hydrocarbon group of 1 to 6 carbon atoms, a partial hydrolyzate thereof or a mixture thereof to hydrolysis and condensation in a mixture of a hydrophilic organic solvent and water in the presence of a basic substance, thereby forming a dispersion of hydrophilic spherical silica particles consisting essentially of $SiO_2$ units in the solvent mixture. The first hydrophobic surface treatment (A2) includes adding a trifunctional silane compound having the general formula (II):

$$R^1Si(OR^4)_3 \tag{II}$$

wherein $R^1$ is a substituted or unsubstituted monovalent hydrocarbon group of 1 to 20 carbon atoms, and $R^4$ is each independently a monovalent hydrocarbon group of 1 to 6 carbon atoms, a partial hydrolyzate thereof or a mixture thereof to the dispersion from step (A1), for conducting surface treatment of the hydrophilic spherical silica particles, thereby obtaining a dispersion of spherical silica particles having $R^1SiO_{3/2}$ units (wherein $R^1$ is as defined above) introduced on their surface in the solvent mixture. The second hydrophobic surface treatment (A3) includes adding a silazane compound having the general formula (III):

$$R^2_3SiNHSiR^2_3 \tag{III}$$

wherein $R^2$ is each independently a substituted or unsubstituted monovalent hydrocarbon group of 1 to 6 carbon atoms, a monofunctional silane compound having the general formula (IV):

$$R^2_3SiX \tag{IV}$$

wherein $R^2$ is as defined above and X is an OH group or hydrolyzable group, or a mixture thereof to the dispersion from step (A2), for conducting surface treatment of the spherical silica particles having $R^1SiO_{3/2}$ units introduced thereon, thereby introducing $R^2_3SiO_{1/2}$ units (wherein $R^2$ is as defined above) on their surface.

In a preferred embodiment, the positive electrode is made of a positive electrode material containing 0.1 to 5% by weight as solids of the hydrophobic spherical silica particles based on the weight of the positive electrode material.

In a preferred embodiment, the negative electrode is made of a negative electrode material containing 0.1 to 5% by weight as solids of the hydrophobic spherical silica particles based on the weight of the negative electrode material.

Advantageous Effects of Invention

The invention is effective for inhibiting absorption and entry of water in a nonaqueous electrolyte secondary battery.

DESCRIPTION OF PREFERRED EMBODIMENTS

One embodiment of the invention is a nonaqueous electrolyte secondary battery comprising a positive electrode, a negative electrode, a separator interposed between the positive and negative electrodes, and a nonaqueous electrolyte. The positive and/or negative electrode is made of an electrode material containing hydrophobic spherical silica particles. The hydrophobic spherical silica particles are obtained by introducing $R^1SiO_{3/2}$ units wherein $R^1$ is a substituted or unsubstituted monovalent hydrocarbon group of 1 to 20 carbon atoms on surfaces of hydrophilic spherical silica particles consisting essentially of $SiO_2$ units, and further introducing $R^2_3SiO^2$ units wherein $R^2$ is independently a substituted or unsubstituted monovalent hydrocarbon group of 1 to 6 carbon atoms on the surfaces having $R^1SiO_{3/2}$ units introduced therein. The spherical silica particles should have an average particle size of 5 nm to 1.00 μm, a particle size distribution $D_{90}/D_{10}$ of up to 3, and an average circularity of 0.8 to 1.

Hydrophobic Spherical Silica Particles

The hydrophobic spherical silica particles are characterized in that (1) they are introduced $R^1SiO_{3/2}$ units wherein $R^1$ is a substituted or unsubstituted monovalent hydrocarbon group of 1 to 20 carbon atoms on surfaces of hydrophilic spherical silica particles consisting essentially of $SiO_2$ units, and further introduced $R^2_3Si_{1/2}$ units wherein $R^2$ is independently a substituted or unsubstituted monovalent hydrocarbon group of 1 to 6 carbon atoms on the surfaces having $R^1SiO_{3/2}$ units introduced thereon, and (2) they have an average particle size of 5 nm to 1.00 μm, a particle size distribution $D_{90}/D_{10}$ of up to 3, and an average circularity of 0.8 to 1.

As alluded to above, the hydrophobic spherical silica particles are obtained by introducing $R^1SiO_{3/2}$ units on surfaces of hydrophilic spherical silica particles consisting essentially of $SiO_2$ units, and further introducing $R^2_3SiO_{1/2}$ units on the surfaces.

The hydrophobic spherical silica particles are obtained, for example, by effecting hydrolysis and condensation of a tetrafunctional silane compound to form a sol-gel method silica precursor having a submicron particle size (i.e., hydrophilic spherical silica particles), and subjecting it to a specific hydrophobic surface treatment. After the hydrophobic treatment, there are obtained hydrophobic spherical silica particles which have a submicron particle size, i.e., maintain the primary particle size of the silica precursor, are free of agglomerates, and capable of absorbing water in electrodes.

As used herein, the phrase hydrophilic spherical silica particles "consisting essentially of $SiO_2$ units" means that particles are basically composed of $SiO_2$ units and have silanol groups at least on their surface as is well known in the art. This means that sometimes, some of hydrolyzable groups (hydrocarbyloxy groups) on the starting material, tetrafunctional silane compound of the general formula (I) or partial hydrolytic condensate thereof (sometimes collectively referred to as tetrafunctional silane compound) may be left, in minor amounts, on the surface or in the interior of particles, without conversion to silanol groups. After hydrophobic surface treatment, the hydrophobic spherical silica particles are hydrophobized on their surface, but silanol groups remain in their interior. By virtue of residual silanol groups, the hydrophobic spherical silica particles, which are incorporated in an electrode, can effectively absorb internal moisture during electrode preparation and thereafter, contributing to electrode stability. It is noted that residual silanol groups can be confirmed by solid NMR spectroscopy.

The hydrophobic spherical silica particles should have an average particle size of 5 nm to 1.00 μm, preferably 10 to 300 nm, more preferably 30 to 200 nm, and even more preferably 30 to 100 nm. If the particle size is less than 5 nm, the effect of inhibiting entry of water into the battery may become insufficient. If the particle size exceeds 1.00 μm, the effect of removing water from the electrode material may become insufficient. As used herein, the term "average particle size" of spherical silica particles is a volume basis median diameter in the particle size distribution measurement by the laser diffraction scattering method.

The hydrophobic spherical silica particles should have a $D_{90}/D_{10}$ value of up to 3, preferably up to 2.9, provided that $D_{90}/D_{10}$ is an index of particle size distribution. The lower limit of $D_{90}/D_{10}$ is not critical for the reason that the lower the $D_{90}/D_{10}$ value, the better are the results. Most often, the lower limit of $D_{90}/D_{10}$ is about 2. It is noted that $D_{10}$ designates a particle diameter corresponding to cumulative 10% by volume counting from the smaller side, and $D_{90}$ designates a particle diameter corresponding to cumulative 90% by volume counting from the smaller side, both in the particle size distribution as measured by the laser diffraction scattering method. A $D_{90}/D_{10}$ value of up to 3 indicates a sharp particle size distribution. A sharp particle size distribution ensures that hydrophobic spherical silica particles are uniformly dispersed in the electrode material, which is effective for inhibiting entry of water or moisture.

As used herein, the term "spherical" includes true spheres and somewhat deformed spheres, and refers to those spheres having an average circularity of 0.8 to 1, preferably 0.92 to 1. The circularity is defined as the circumference of a circle equal to the area of a particle divided by the peripheral length of the particle, which may be determined by analysis of particle images taken under an electron microscope or the like. It is also preferred from the standpoint of imparting good fluidity that the spherical silica particles be primary particles.

In a preferred embodiment, the hydrophobic spherical silica particles are obtained through the steps of (A1) subjecting a tetrafunctional silane compound, a partial hydrolytic condensate thereof or a combination thereof to hydrolysis and condensation to form hydrophilic spherical silica particles consisting essentially of $SiO_2$ units, (A2) introducing $R^1SiO_{3/2}$ units on surfaces of the hydrophilic spherical silica particles, and (A3) further introducing $R^2{}_3SiO_{1/2}$ units on the surfaces having $R^1SiO_{3/2}$ units introduced thereon.

That is, the preferred method for preparing hydrophobic spherical silica particles involves:
step (A1): formation of hydrophilic spherical silica particles,
step (A2): first hydrophobic surface treatment with trifunctional silane compound, and
step (A3): second hydrophobic surface treatment with monofunctional silane compound. These steps are described in detail.

The step (A1) of forming hydrophilic spherical silica particles includes subjecting a tetrafunctional silane compound having the general formula (I):

wherein $R^3$ is each independently a monovalent hydrocarbon group of 1 to 6 carbon atoms, a partial hydrolyzate thereof or a mixture thereof to hydrolysis and condensation in a mixture of a hydrophilic organic solvent and water in the presence of a basic substance, thereby forming a dispersion of hydrophilic spherical silica particles consisting essentially of $SiO_2$ units in the solvent mixture.

In formula (I), $R^3$ is each independently a monovalent hydrocarbon group of 1 to 6 carbon atoms, preferably 1 to 4 carbon atoms, and more preferably 1 to 2 carbon atoms. Exemplary of the monovalent hydrocarbon group are alkyl groups such as methyl, ethyl, propyl, and butyl, and aryl groups such as phenyl. Of these, methyl, ethyl, propyl, and butyl are preferred, with methyl and ethyl being most preferred.

Preferred examples of the tetrafunctional silane compound having formula (I) include tetraalkoxysilanes such as tetramethoxysilane, tetraethoxysilane, tetrapropoxysilane, and tetrabutoxysilane, and tetraphenoxysilane. Of these, tetramethoxysilane, tetraethoxysilane, tetrapropoxysilane, and tetrabutoxysilane are preferred, with tetramethoxysilane and tetraethoxysilane being most preferred. Those tetraalkoxysilanes whose alkoxy moiety has a smaller carbon count are preferred for the purpose of obtaining spherical silica particles having a smaller particle size.

Exemplary of the partial hydrolyzate of tetrafunctional silane compound are alkyl silicates such as methyl silicate and ethyl silicate.

The hydrophilic organic solvent is not particularly limited as long as the tetrafunctional silane compound having formula (I), partial hydrolytic condensate thereof and water are soluble or miscible. Suitable solvents include alcohols, cellosolves such as methyl cellosolve, ethyl cellosolve, butyl cellosolve, and cellosolve acetate, ketones such as acetone and methyl ethyl ketone, and ethers such as dioxane and tetrahydrofuran, which may be used alone or in admixture of two or more. Inter alia, the alcohols and cellosolves are preferred, with the alcohols being more preferred.

The alcohols used herein include alcohols having the general formula (V):

wherein $R^5$ is a monovalent hydrocarbon group of 1 to 6 carbon atoms. In formula (V), $R^5$ is a monovalent hydrocarbon group of 1 to 6 carbon atoms, preferably 1 to 4 carbon atoms, and more preferably 1 to 2 carbon atoms. Typical of the monovalent hydrocarbon group are alkyl groups such as methyl, ethyl, propyl, isopropyl, and butyl. Of these, methyl, ethyl, propyl, and isopropyl are preferred, with methyl and ethyl being most preferred. Examples of the alcohol having formula (V) include methanol, ethanol, propanol, isopropanol and butanol, with methanol and ethanol being preferred. For the reason that the particle size of spherical silica particles increases as the carbon count of alcohol increases, methanol is most preferred for the purpose of obtaining spherical silica particles with a smaller particle size.

In the solvent mixture, water is preferably used in such amounts that 0.5 to 5 moles, more preferably 0.6 to 2 moles, and even more preferably 0.7 to 1 mole of water is present per mole of total hydrocarbyloxy groups on the tetrafunctional silane compound. The hydrophilic organic solvent and water are preferably mixed such that the weight ratio of organic solvent to water may range from 0.5/1 to 10/1, more preferably from 3 to 9, and even more preferably from 5 to 8. As the proportion of hydrophilic organic solvent increases, the particle size of spherical silica particles becomes smaller.

Suitable basic substances include ammonia, dimethylamine, and diethylamine, which may be used alone or in admixture. Inter alia, ammonia and diethylamine are preferred, with ammonia being most preferred. On use, a predetermined amount of the basic substance is dissolved in water to form an aqueous basic solution, which may be mixed with the hydrophilic organic solvent.

An appropriate amount of the basic substance is 0.01 to 2 moles, more preferably 0.02 to 0.5 mole, and even more preferably 0.04 to 0.12 mole per mole of total hydrocarbyloxy groups on the tetrafunctional silane compound. As the amount of the basic substance used is reduced within the range, the particle size of spherical silica particles becomes smaller.

The hydrolysis and condensation of the tetrafunctional silane compound may be carried out by the well-known technique, specifically by adding the tetrafunctional silane compound to a solvent mixture of the hydrophilic organic solvent and water containing the basic substance. For the hydrolytic condensation, a temperature of 5 to 60° C. and a time of 0.5 to 10 hours are preferred. As the temperature becomes higher within the range, the particle size of spherical silica particles becomes smaller.

As a result of hydrolytic condensation, a dispersion of hydrophilic spherical silica particles consisting essentially of $SiO_2$ units in the solvent mixture is obtained. This dispersion (A1) typically has a concentration of 3 to 15% by weight, preferably 5 to 10% by weight.

Step (A2) of first hydrophobic surface treatment with trifunctional silane compound includes adding a trifunctional silane compound having the general formula (II):

$$R^1Si(OR^4)_3 \quad (II)$$

wherein $R^1$ is a substituted or unsubstituted monovalent hydrocarbon group of 1 to 20 carbon atoms, and $R^4$ is each independently a monovalent hydrocarbon group of 1 to 6 carbon atoms, a partial hydrolyzate thereof or a mixture thereof to the dispersion from step (A1), for conducting surface treatment of the hydrophilic spherical silica particles, thereby obtaining a dispersion of spherical silica particles having $R^1SiO_{3/2}$ units (wherein $R^1$ is as defined above) introduced on their surface in the solvent mixture.

This step (A2) is essential to prevent spherical silica particles from agglomerating during the subsequent concentration step (A'). If agglomeration is not restrained, the resulting hydrophobic spherical silica particles may fail to maintain the primary particle size and lose the water removal ability.

In formula (II), $R^1$ is a substituted or unsubstituted monovalent hydrocarbon group of 1 to 20 carbon atoms, preferably 1 to 3 carbon atoms, and more preferably 1 to 2 carbon atoms. Exemplary of the monovalent hydrocarbon group $R^1$ are alkyl groups such as methyl, ethyl, n-propyl, isopropyl, butyl, and hexyl. Of these, methyl, ethyl, n-propyl, and isopropyl are preferred, with methyl and ethyl being most preferred. Also included are substituted forms of monovalent hydrocarbon groups in which some or all hydrogen atoms are substituted by halogen atoms such as fluorine, chlorine or bromine, preferably fluorine.

In formula (II), $R^4$ is each independently a monovalent hydrocarbon group of 1 to 6 carbon atoms, preferably 1 to 3 carbon atoms, and more preferably 1 to 2 carbon atoms. Exemplary of the monovalent hydrocarbon group $R^4$ are alkyl groups such as methyl, ethyl, propyl, and butyl. Of these, methyl, ethyl, and propyl are preferred, with methyl and ethyl being most preferred.

Exemplary of the trifunctional silane compound having formula (II) are trialkoxysilanes including methyltrimethoxysilane, methyltriethoxysilane, ethyltrimethoxysilane, ethyltriethoxysilane, n-propyltrimethoxysilane, n-propyltriethoxysilane, isopropyltrimethoxysilane, isopropyltriethoxysilane, butyltrimethoxysilane, butyltriethoxysilane, hexyltrimethoxysilane, trifluoropropyltrimethoxysilane, and heptadecafluorodecyltrimethoxysilane, and partial hydrolyzates thereof, which may be used alone or in admixture. Inter alia, methyltrimethoxysilane, methyltriethoxysilane, ethyltrimethoxysilane, ethyltriethoxysilane, and partial hydrolyzates thereof are preferred, with methyltrimethoxysilane, methyltriethoxysilane, and partial hydrolyzates thereof being most preferred.

An appropriate amount of the trifunctional silane compound having formula (II) added is 0.001 to 1 mole, more preferably 0.01 to 0.1 mole, and even more preferably 0.01 to 0.05 mole per mole of silicon atoms in the hydrophilic spherical silica particles. If the addition amount is less than 0.001 mole, the resulting hydrophobic particles may be less dispersible. An addition amount in excess of 1 mole may allow spherical silica particles to agglomerate together in step (A2).

In step (A2), a trifunctional silane compound having formula (II), a partial hydrolyzate thereof or a mixture thereof (sometimes collectively referred to as trifunctional silane compound) is added to the dispersion from step (A1) for thereby conducting surface treatment of the hydrophilic spherical silica particles. There are obtained spherical silica particles having $R^1SiO_{3/2}$ units (wherein $R^1$ is as defined above) introduced on their surface.

Specifically, the hydrophilic spherical silica particles having $R^1SiO_{3/2}$ units introduced on their surface are dispersed in the solvent mixture. This dispersion (A2) preferably has a concentration of 3% by weight to less than 15% by weight, more preferably 5 to 10% by weight. Outside the range, a lower concentration may lead to a drop of productivity whereas a higher concentration may allow spherical silica particles to agglomerate together in step (A2).

If desired, step (A2) may be followed by a concentration step (A') of removing a portion of the hydrophilic organic solvent and water from the dispersion from step (A2). That is, the dispersion (A2) may be concentrated into a concentrated dispersion (A').

The means of removing a portion of the hydrophilic organic solvent and water may be, for example, distillation or vacuum distillation. The temperature may be selected as appropriate depending on the hydrophilic organic solvent and its proportion, and a temperature of 60 to 110° C. is typically used. To the dispersion (A2), a hydrophobic solvent may be added prior to or during the concentration step. Suitable hydrophobic solvents include hydrocarbon and ketone solvents, which may be used alone or in admixture. Examples include toluene, xylene, methyl ethyl ketone, and methyl isobutyl ketone, with methyl isobutyl ketone being preferred.

The concentrated dispersion (A') should preferably contain 15 to 40% by weight, more preferably 20 to 35% by weight, and even more preferably 25 to 30% by weight of spherical silica particles. A concentration of at least 15% by weight ensures smooth progress of the subsequent step (A3) whereas a concentration in excess of 40% by weight may cause spherical silica particles to agglomerate together during step (A3).

The concentration step (A') is effective to prevent a failure in the subsequent step (A3), i.e., the phenomenon that a silazane compound having formula (III), a monofunctional silane compound having formula (IV) or a mixture thereof serving as a surface treating agent can react with the hydrophilic organic solvent and water to make the surface treatment insufficient, allowing the resulting hydrophobic spherical silica particles to agglomerate together in subsequent drying so that the hydrophobic spherical silica particles fail to maintain the primary particle size, thus preventing effective drying and recovery.

The step (A3) of second hydrophobic surface treatment with monofunctional silane compound includes adding a silazane compound having the general formula (III):

$$R^2_3SiNHSiR^2_3 \quad (III)$$

wherein $R^2$ is each independently a substituted or unsubstituted monovalent hydrocarbon group of 1 to 6 carbon atoms, a monofunctional silane compound having the general formula (IV):

$$R^2_3SiX \quad (IV)$$

wherein $R^2$ is as defined above and X is an OH group or hydrolyzable group, or a mixture thereof to the optionally concentrated dispersion from step (A2) or (A'), for conducting surface treatment of the spherical silica particles having $R^1SiO_{3/2}$ units introduced thereon, thereby introducing $R^2_3SiO_{1/2}$ units (wherein $R^2$ is as defined above) on their surface. The silazane compound and monofunctional silane compound may be used alone or in admixture of two or more.

In formulae (III) and (IV), $R^2$ is each independently a substituted or unsubstituted monovalent hydrocarbon group of 1 to 6 carbon atoms, preferably 1 to 4 carbon atoms, and more preferably 1 to 2 carbon atoms. Exemplary of the monovalent hydrocarbon group $R^2$ are alkyl groups such as methyl, ethyl, propyl, isopropyl, and butyl. Of these, methyl, ethyl, and propyl are preferred, with methyl and ethyl being most preferred. Also included are substituted forms of monovalent hydrocarbon groups in which some or all hydrogen atoms are substituted by halogen atoms such as fluorine, chlorine or bromine, preferably fluorine.

X is a hydroxyl or hydrolyzable group. Exemplary of the hydrolyzable group are chlorine, alkoxy, amino, and acyloxy groups. Inter alia, alkoxy and amino groups are preferred, with the alkoxy groups being more preferred.

Examples of the silazane compound having formula (III) include hexamethyldisilazane and hexaethyldisilazane, with hexamethyldisilazane being preferred.

Examples of the monofunctional silane compound having formula (IV) include monosilanol compounds such as trimethylsilanol and triethylsilanol, monochlorosilanes such as trimethylchlorosilane and triethylchlorosilane, monoalkoxysilanes such as trimethylmethoxysilane and trimethylethoxysilane, monoaminosilanes such as trimethylsilyldimethylamine and trimethylsilyldiethylamine, and monoacyloxysilanes such as trimethylacetoxysilane. Inter alia, trimethylsilanol, trimethylmethoxysilane and trimethylsilyldiethylamine are preferred, with trimethylsilanol and trimethylmethoxysilane being more preferred.

Preferably, the silazane compound and/or monofunctional silane compound is added in an amount of 0.1 to 0.5 mole, more preferably 0.2 to 0.4 mole, and even more preferably 0.25 to 0.35 mole per mole of silicon atoms of the hydrophilic spherical silica particles. If the addition amount is less than 0.1 mole, the resulting particles may be less dispersible. More than 0.5 mole of the compound may be uneconomical.

In step (A3), a silazane compound having formula (III), a monofunctional silane compound having formula (IV), or a mixture thereof is added to the optionally concentrated dispersion from step (A2) or (A'), whereby the spherical silica particles having units introduced thereon are surface treated with the relevant compound. There are obtained hydrophobic spherical silica particles further having $R^2_3SiO_{1/2}$ units introduced on their surface.

With respect to the proportion of respective units introduced in the hydrophobic spherical silica particles, $R^1SiO_{3/2}$ units are preferably introduced in such an amount to provide 0.001 to 1 mole, more preferably 0.01 to 0.1 mole, and even more preferably 0.01 to 0.05 mole of silicon atoms in $R^1SiO_{3/2}$ units; and $R^2_3SiO_{1/2}$ units are preferably introduced in such an amount to provide 0.1 to 0.5 mole, more preferably 0.2 to 0.4 mole, and even more preferably 0.25 to 0.35 mole of silicon atoms in $R^2_3SiO_{1/2}$ units, both per mole of silicon atoms of the hydrophilic spherical silica particles.

The hydrophobic spherical silica particles are obtained as dispersed in the solvent mixture. The dispersion (A3) preferably has a concentration of 15 to 40% by weight. Upon atmospheric drying or vacuum drying, the hydrophobic spherical silica particles are recovered in powder form.

Electrode Material

According to the invention, the hydrophobic spherical silica particles are incorporated in an electrode material of which a positive and/or negative electrode of a nonaqueous electrolyte secondary battery is made. The particles may be incorporated in either the electrode material for positive electrode or the electrode material for negative electrode, or both. Preferably the particles are incorporated in both the positive and negative electrode materials.

If the proportion of hydrophobic spherical silica particles incorporated in the electrode material is too high, the hydrophobic spherical silica particles function as electric resistance, thus adversely affecting the rate characteristics of the battery, rather than exerting the effect of absorbing water in the battery and the effect of inhibiting entry of water into the battery. It is thus preferred from the aspect of exerting the effect of absorbing water in the battery and the effect of inhibiting entry of water into the battery while maintaining the rate characteristics that the content (in % by weight of solids) of hydrophobic spherical silica particles is 0.1 to 5% by weight, more preferably 0.5 to 5% by weight of the positive electrode material, and 0.1 to 5% by weight, more preferably 0.5 to 5% by weight of the negative electrode material.

Secondary Battery

The nonaqueous electrolyte secondary battery is defined as comprising a positive electrode, a negative electrode, a separator interposed between the positive and negative electrodes, and a nonaqueous electrolyte. Typically the nonaqueous electrolyte secondary battery is a lithium ion secondary battery.

(1) Positive Electrode

The positive electrode material comprises a positive electrode active material, conductive agent, binder, viscosity modifier, and the like.

The positive electrode active materials may be used alone or in admixture of two or more. Suitable positive electrode active materials include lithium, lithium-containing complex oxides, and composite metals such as $NbSe_2$. Also included are sulfides and oxides of metals exclusive of lithium such as $TiS_2$, $MoS_2$, $NbS_2$, $ZrS_2$, $VS_2$, $V_2O_5$, $MoO_3$, and $Mg(V_3O_8)_2$. For increasing the energy density, lithium complex oxides based on $Li_pMetO_2$ are preferred wherein Met is preferably at least one element of cobalt, nickel, iron and manganese and p has a value in the range: $0.05 \leq p \leq 1.10$. Illustrative examples of the lithium complex oxides include $LiCoO_2$, $LiNiO_2$, $LiFeO_2$, and $Li_qNi_rCo_{1-r}O_2$ (wherein q and r have values varying with the charged/discharged state of the battery and usually in the range: $0<q<1$ and $0.7<r\leq 1$) having a layer structure, $LiMn_2O_4$ having a spinel structure, and rhombic $LiMnO_2$. Also used for high voltage operation is a substitutional spinel type manganese compound: $LiMet_sMn_{1-s}O_4$ wherein Met is titanium, chromium, iron, cobalt, nickel, copper, zinc or the like and s has a value in the range: $0<s<1$.

The lithium complex oxide may be prepared, for example, by grinding and mixing a carbonate, nitrate, oxide or hydroxide of lithium and a carbonate, nitrate, oxide or hydroxide of a transition metal in accordance with the desired composition, and firing at a temperature in the range of 600 to 1,000° C. in an oxygen atmosphere.

Organic materials may also be used as the positive electrode active material. Examples include polyacetylene, polypyrrole, poly-p-phenylene, polyaniline, polythiophene, polyacene, and polysulfide.

(2) Negative Electrode

The negative electrode material comprises a negative electrode active material, conductive agent, binder, viscosity modifier, and the like.

The negative electrode active materials may be used alone or in admixture of two or more. Suitable negative electrode active materials are carbon materials including non-graphitizable carbon, graphitizable carbon, graphite, pyrolytic carbons, coke, vitreous carbons, fired organic polymers, carbon fibers, and active carbon. Also included are materials capable of occluding and releasing lithium ions and containing at least one of metal and semi-metal elements; silicon; composites in which silicon nanoparticles are dispersed in a silicon compound; silicon oxides of the formula: $SiO_x$ wherein $0.5 \leq x < 1.6$; silicon-free metal oxides represented by the formula: $MO_a$ wherein M is at least one metal selected from among Ge, Sn, Pb, Bi, Sb, Zn, In and Mg and "a" is a positive number of 0.1 to 4; and lithium complex oxides (which may contain silicon) represented by the formula: $LiM_bO_c$ wherein M is at least one metal selected from among Ge, Sn, Pb, Bi, Sb, Zn, In, Mg and Si, b is a positive number of 0.1 to 4, and c is a positive number of 0.1 to 8. Specific examples include $GeO$, $GeO_2$, $SnO$, $SnO_2$, $Sn_2O_3$, $Bi_2O_3$, $Bi_2O_5$, $Sb_2O_3$, $Sb_2O_4$, $Sb_2O_5$, $ZnO$, $In_2O$, $InO$, $In_2O_3$, $MgO$, $Li_2SiO_3$, $Li_4SiO_4$, $Li_2Si_3O_7$, $Li_2Si_2O_5$, $Li_8SiO_6$, $Li_6Si_2O_7$, $Li_4Ge_9O_7$, $Li_4Ge_9O_2$, $Li_5Ge_8O_{19}$, $Li_4Ge_5O_{12}$, $Li_5Ge_2O_7$, $Li_4GeO_4$, $Li_2Ge_7O_{15}$, $Li_2GeO_3$, $Li_2Ge_4O_9$, $Li_2SnO_3$, $Li_8SnO_6$, $Li_2PbO_3$, $Li_7SbO_5$, $LiSbO_3$, $Li_3SbO_4$, $Li_2BiO_5$, $Li_6BiO_6$, $LiBiO_2$, $Li_4Bi_6O_{11}$, $Li_6ZnO_4$, $Li_4ZnO_3$, $Li_2ZnO_2$, $LiInO_2$, $Li_3InO_3$, and analogous non-stoichiometric compounds.

Among others, silicon (Si), composites having silicon nanoparticles dispersed in a silicon compound, and silicon oxides $SiO_x$ wherein $0.5 \leq x < 1.6$ are preferred.

Typically the negative electrode material is in the form of particles, preferably having an average particle size of 0.01 to 30 μm, more preferably 0.1 to 10 μm, and even more preferably 0.5 to 6 μm. As used herein, the average particle size is a cumulative 50% by volume diameter $D_{50}$, i.e., a particle diameter corresponding to cumulative 50% by volume in the particle size distribution measurement by the laser diffraction scattering method.

As mentioned above, the positive electrode material comprises a positive electrode active material, conductive agent, binder, viscosity modifier, and the like. Preferably the positive electrode material comprises 90 to 98% of the active material, 0.5 to 5.0% of the conductive agent, 0.5 to 5.0% of the binder, and 0% or 0.1 to 3.0% of the viscosity modifier, expressed in % by weight of solids. Likewise, the negative electrode material comprises a negative electrode active material, conductive agent, binder, viscosity modifier, and the like. Preferably the negative electrode material comprises 75 to 98%, more preferably 80 to 98% of the active material, 1 to 20%, more preferably 2 to 10% of the conductive agent, 1 to 20%, more preferably 3 to 10% of the binder, and 0% or 0.1 to 3.0% of the viscosity modifier, expressed in % by weight of solids.

Suitable conductive agents include metal powders and fibers such as Al, Ti, Fe, Ni, Cu, Zn, Ag, Sn, and Si, and various types of graphite such as natural graphite, synthetic graphite, various coke powders, meso-phase carbon, vapor grown carbon fibers, pitch-based carbon fibers, PAN-based carbon fibers, and fired resins. They may be used alone or in admixture.

Suitable binders include polyimide resins, polyamide resins, and polyamide-imide resins, specifically polyvinylidene fluoride (PVDF) and styrene-butadiene rubber (SBR). They may be used alone or in admixture.

Suitable viscosity modifiers include carboxymethyl cellulose, sodium polyacrylate, other acrylic polymers and fatty acid esters. They may be used alone or in admixture.

The positive or negative electrode material may be shaped into a positive or negative electrode form by the following exemplary procedure. The positive or negative electrode material comprising the active material, conductive agent, binder and other additives is combined with a solvent suitable for dissolving or dispersing the binder, such as N-methylpyrrolidone or water, and kneaded into a paste mix, which is applied in sheet form to a current collector. The current collector may be copper foil, nickel foil or any other materials which are typically used as the electrode current collector while its thickness and surface treatment are not critical. The method of shaping the mix into a sheet is not particularly limited and any well-known methods may be used. Typically, the positive or negative electrode shaped form has a thickness of about 3 to 500 μm, though the thickness is not critical.

(3) Separator

The separator interposed between the positive and negative electrodes is not particularly limited as long as it is stable to the electrolytic solution and holds the solution effectively. The separator is most often a porous sheet or non-woven fabric of polyolefins such as polyethylene, polypropylene and copolymers thereof and aramide resins. Such sheets may be used as a single layer or a laminate of multiple layers. Ceramics such as metal oxides may be deposited on the surface of sheets. Porous glass and ceramics are employed as well.

(4) Nonaqueous Electrolyte

Exemplary of the nonaqueous electrolyte are light metal salts. Examples of the light metal salts include salts of alkali metals such as lithium, sodium and potassium, salts of alkaline earth metals such as magnesium and calcium, and aluminum salts. A choice may be made among these salts and mixtures thereof depending on a particular purpose. Examples of suitable lithium salts include $LiBF_4$, $LiClO_4$, $LiPF_6$, $LiAsF_6$, $CF_3SO_3Li$, $(CF_3SO_2)_2NLi$, $C_4F_9SO_3Li$, $CF_3CO_2Li$, $(CF_3CO_2)_2NLi$, $C_6F_5SO_3Li$, $C_8F_{17}SO_3Li$, $(C_2F_5SO_2)_2NLi$, $(C_4F_9SO_2)(CF_3SO_2)NLi$, $(FSO_2C_6F_4)(CF_3SO_2)NLi$, $((CF_3)CHOSO_2)_2NLi$, $(CF_3SO_2)_3CLi$, $(3,5-(CF_3)_2C_6F_3)_4BLi$, $LiCF_3$, $LiAlCl_4$, and $C_4BO_8Li$, which may be used alone or in admixture.

The nonaqueous solvent is not particularly limited as long as it can serve for the nonaqueous electrolytic solution. Suitable solvents include aprotic high-dielectric-constant solvents such as ethylene carbonate, propylene carbonate, butylene carbonate, and γ-butyrolactone; and aprotic low-viscosity solvents such as dimethyl carbonate, ethyl methyl carbonate, diethyl carbonate, methyl propyl carbonate, dipropyl carbonate, diethyl ether, tetrahydrofuran, 1,2-dimethoxyethane, 1,2-diethoxyethane, 1,3-dioxolan, sulfolane, methylsulfolane, acetonitrile, propionitrile, anisole, acetic acid esters, e.g., methyl acetate and propionic acid esters. It is desirable to use a mixture of an aprotic high-dielectricconstant solvent and an aprotic low-viscosity solvent in a proper ratio. It is also acceptable to use ionic liquids containing imidazolium, ammonium and pyridinium cations. The counter anions are not particularly limited and include $BF_4^-$, $PF_6^-$ and $(CF_3SO_2)_2N^-$. The ionic liquid may be used in admixture with the foregoing solvent for non-aqueous electrolytic solution.

Where a solid electrolyte or gel electrolyte is desired, a glass based inorganic solid electrolyte, polyether gel, silicone gel, silicone polyether gel, acrylic gel, silicone acrylic gel, acrylonitrile gel, poly(vinylidene fluoride) or the like may be included as polymer component. These ingredients may be polymerized prior to or after casting. They may be used alone or in admixture.

If desired, various additives may be added to the nonaqueous electrolytic solution. Examples include an additive for improving cycle life such as vinylene carbonate, methyl vinylene carbonate, ethyl vinylene carbonate and 4-vinylethylene carbonate, an additive for preventing over-charging such as biphenyl, alkylbiphenyl, cyclohexylbenzene, t-butylbenzene, diphenyl ether, and benzofuran, and an additive for acid removal and water removal purposes such as various carbonate compounds (e.g., carbon dioxide gas), carboxylic acid anhydrides, nitrogen- and sulfur-containing compounds. The foregoing compounds which are partially fluorinated are also useful.

Usually the nonaqueous electrolyte secondary battery further comprises a casing for receiving the foregoing components in a tight seal manner. The battery may take any desired shape without particular limits. In general, the battery is of the coin type wherein electrodes and a separator, all punched into coin shape, are stacked, or of the rectangular or cylinder type wherein electrode sheets and a separator are spirally wound.

EXAMPLE

Synthesis Examples, Examples, and Comparative Examples are given below for further illustrating the invention, but they are not to be construed as limiting the invention thereto.
Synthesis of Hydrophobic Spherical Silica Particles Synthesis Example 1
Step (a1): Formation of Hydrophilic Spherical Silica Particles A 3-liter glass reactor equipped with a stirrer, dropping funnel and thermometer was charged with 989.5 g (to give a weight ratio of methanol to water of 5.4) of methanol, 135.5 g (3.6 moles per mole of tetramethoxysilane) of water, and 66.5 g (0.38 mole of ammonia per mole of tetramethoxysilane) of 28 wt % aqueous ammonia, which were mixed. To the solution which was adjusted at 35° C., with stirring, 436.5 g (2.87 moles) of tetramethoxysilane was added dropwise over 6 hours. After the completion of dropwise addition, stirring was continued for a further 0.5 hour to conduct hydrolysis, yielding a suspension of hydrophilic spherical silica particles.
Step (A2): First Hydrophobic Surface Treatment To the suspension, 4.4 g (0.03 mole, to give a molar ratio to silicon atoms of hydrophilic spherical silica particles of 0.01) of methyltrimethoxysilane was added dropwise over 0.5 hour. After the completion of dropwise addition, stirring was continued for a further 12 hours to conduct hydrophobic treatment on surfaces of silica particles, yielding a dispersion of hydrophobic spherical silica particles. The concentration of hydrophobic spherical silica particles in the dispersion was 11% by weight.

Step (A'): Concentration

The glass reactor was equipped with an ester adaptor and condenser tube. The dispersion from step (A2) was heated at 60-70° C., whereby methanol and water were distilled off in a total amount of 1,021 g, yielding a concentrated dispersion of hydrophobic spherical silica particles in the solvent mixture. The concentration of hydrophobic spherical silica particles in the concentrated dispersion was 28% by weight.
Step (A3): Second Hydrophobic Surface Treatment To the concentrated dispersion from step (A') at room temperature, 138.4 g (0.86 mole, to give a molar ratio to silicon atoms of hydrophilic spherical silica particles of 0.3) of hexamethyldisilazane was added. The dispersion was heated at 50-60° C. for 9 hours for reaction, that is, trimethylsilylating reaction on silica particles in the dispersion. From the dispersion, the solvents were distilled off at 130° C. under a vacuum of 6,650 Pa, yielding 186 g of hydrophobic spherical silica particles (1).

The hydrophilic spherical silica particles from step (A1) were analyzed by Measurement Method 1 as described below. The hydrophobic spherical silica particles obtained through steps (A1) to (A3) were analyzed by Measurement Methods 2 to 4 as described below. The results are shown in Table 1.
Measurement Methods 1 to 4: Analysis of Silica Particles
1. Measurement of Average Particle Size of Hydrophilic Spherical Silica Particles Obtained from Step (a1)

The silica particle suspension was added to methanol so as to give a concentration of 0.5% by weight of silica particles. The suspension was ultrasonified for 10 minutes for dispersing the particles. The particle size distribution of thus dispersed particles was measured by a Nanotrac particle size distribution analyzer by the dynamic light scattering/laser Doppler method (trade name UPA-EX150 by Nikkiso Co., Ltd.). The median diameter on volume basis is reported as the average particle size. The median diameter is a particle diameter at cumulative 50% by volume when the particle size distribution is expressed as cumulative distribution.
2. Measurement of Average Particle Size and Particle Size Distribution $D_{90}/D_{10}$ of Hydrophobic Spherical Silica Particles Obtained from Step (A3)

The silica particles were added to methanol so as to give a concentration of 0.5% by weight of silica particles. This was ultrasonified for 10 minutes for dispersing the particles. The particle size distribution of thus dispersed particles was measured by a Nanotrac particle size distribution analyzer by the dynamic light scattering/laser Doppler method (trade name UPA-EX150 by Nikkiso Co., Ltd.). The median diameter on volume basis is reported as the average particle size.

The particle size distribution $D_{90}/D_{10}$ was determined from measurements of $D_{10}$ and $D_{90}$ wherein $D_{10}$ and $D_{90}$ correspond to a particle diameter at cumulative 10% and 90% by volume counting from the smaller side in the particle size distribution measurement, respectively.
3. Measurement of Shape of Hydrophobic Spherical Silica Particles Sample particles were observed under an electron microscope S-4700 (Hitachi, Ltd., magnifying power ×$10^5$) for inspecting their shape. Not only true spheres, but also somewhat deformed spheres are included in the "spherical" particles. The particle shape was evaluated in terms of circularity when a particle is projected as a two-dimensional image. Particles are regarded as "spherical" when they have a circularity in the range of 0.8 to 1. The circularity is defined as the circumference of a circle equal to the area of a particle divided by the peripheral length of the particle.

4. Measurement of Water Adsorption of Hydrophobic Spherical Silica Particles

A powder sample, 3 g, was uniformly spread on a dish, which was placed in a constant temperature/humidity chamber IG420 (Yamato Scientific Co., Ltd.) whereupon a water content was measured. Using a thermogravimetry differential thermal analyzer TG8120 (Rigaku Corp.), the sample was heated from room temperature (25° C.) to 200° C., and a percent weight loss was computed and reported as the water content. Both the initial sample and the sample which was held at 25° C. and 50% RH for 3 days were measured for water content.

Synthesis Example 2

The procedure of Synthesis Example 1 was repeated except that 1045.7 g of methanol, 112.6 g of water, and 33.2 g of 28 wt % aqueous ammonia were used in step (A1). There was obtained 188 g of hydrophobic spherical silica particles (2). The silica particles (2) were analyzed as in Synthesis Example 1, with the results shown in Table 1.

Synthesis Example 3

Step (A1): Formation of Hydrophilic Spherical Silica Particles

A 3-liter glass reactor equipped with a stirrer, dropping funnel and thermometer was charged with 623.7 g of methanol, 41.4 g of water, and 49.8 g of 28 wt % aqueous ammonia, which were mixed. To the solution which was adjusted at 35° C., with stirring, 1,163.7 g of tetramethoxysilane and 418.1 g of 5.4 wt % aqueous ammonia were concurrently added dropwise over 6 hours and 4 hours, respectively. After the completion of dropwise addition of tetramethoxysilane, stirring was continued for a further 0.5 hour to conduct hydrolysis, yielding a suspension of silica particles.

Step (A2): First Hydrophobic Surface Treatment

To the suspension at room temperature, 11.6 g (to give a molar ratio of methyltrimethoxysilane to tetramethoxysilane of 0.01) of methyltrimethoxysilane was added dropwise over 0.5 hour. After the completion of dropwise addition, stirring was continued for a further 12 hours to conduct hydrophobic treatment on surfaces of silica particles.

Step (A'): Concentration

The glass reactor was equipped with an ester adaptor and condenser tube. To the dispersion of surface treated silica particles from step (A2), 1,440 g of methyl isobutyl ketone was added. The dispersion was heated at 80 to 110° C. for 7 hours, whereby methanol and water were distilled off.

Step (A3): Second Hydrophobic Surface Treatment

To the concentrated dispersion from step (A') at room temperature, 357.6 g of hexamethyldisilazane was added. The dispersion was heated at 120° C. for 3 hours for reaction, that is, trimethylsilylating reaction on silica particles. From the dispersion, the solvents were distilled off under vacuum, yielding 472 g of hydrophobic spherical silica particles (3). The silica particles (3) were analyzed as in Synthesis Example 1, with the results shown in Table 1.

Synthesis Example 4

The procedure of Synthesis Example 3 was repeated except that the temperature for hydrolysis of tetramethoxysilane was changed from 35° C. to 20° C. during the synthesis of silica particles. There was obtained 469 g of hydrophobic spherical silica particles (4). The silica particles (4) were analyzed as in Synthesis Example 1, with the results shown in Table 1.

For all the hydrophobic spherical silica particles of Synthesis Examples 1 to 4, residual silanol groups in their interior were detected on solid NMR spectroscopy.

Comparative Synthesis Example 1

A 0.3-liter glass reactor equipped with a stirrer and thermometer was charged with 100 g of VMC silica (trade name SOC1 by Admatechs Co., Ltd., VMC: vaporized metal combustion). With stirring, 1 g of deionized water was added. With the reactor closed, stirring was continued at 60° C. for 10 hours. The reactor was cooled to room temperature, after which with stirring, 2 g of hexamethyldisilazane was added. With the reactor closed, stirring was continued for a further 24 hours. The reactor was heated at 120° C., whereupon the residual reactant and ammonia formed were removed while feeding nitrogen gas. There was obtained 100 g of hydrophobic spherical silica particles (5). The silica particles (5) were analyzed as in Synthesis Example 1, with the results shown in Table 1.

Comparative Synthesis Example 2

A 0.3-liter glass reactor equipped with a stirrer and thermometer was charged with 100 g of VMC silica (trade name SOC1 by Admatechs Co., Ltd.). With stirring, 1 g of deionized water was added. With the reactor closed, stirring was continued at 60° C. for 10 hours. The reactor was cooled to room temperature, after which with stirring, 1 g of methyltrimethoxysilane was added. With the reactor closed, stirring was continued for a further 24 hours. With stirring, 2 g of hexamethyldisilazane was added. With the reactor closed, stirring was continued for a further 24 hours. The reactor was heated at 120° C., whereupon the residual reactants and ammonia formed were removed while feeding nitrogen gas. There was obtained 101 g of hydrophobic irregular silica particles (6). The silica particles (6) were analyzed as in Synthesis Example 1, with the results shown in Table 1.

TABLE 1

|  | Synthesis Example | | | | Comparative Synthesis Example | |
| --- | --- | --- | --- | --- | --- | --- |
|  | 1 | 2 | 3 | 4 | 1 | 2 |
| Silica particles | (1) | (2) | (3) | (4) | (5) | (6) |
| (A1) Average particle size[1] (nm) | 52 | 11 | 115 | 230 | — | — |

TABLE 1-continued

|      |                                              | Synthesis Example |   |   |   | Comparative Synthesis Example |   |
|------|----------------------------------------------|---------|---------|---------|---------|----------|----------|
|      |                                              | 1       | 2       | 3       | 4       | 1        | 2        |
| (A3) | Average particle size[2] (nm)                | 52      | 11      | 115     | 238     | 300      | 300      |
|      | Particle size distribution $D_{90}/D_{10}$   | 2.21    | 2.40    | 2.23    | 2.80    | 5.40     | 4.80     |
|      | Shape                                        | spherical | spherical | spherical | spherical | spherical | irregular |
|      | Circularity                                  | 0.86    | 0.92    | 0.90    | 0.81    | 0.80     | 0.65     |
|      | Water content (%) at initial                 | 2.2     | 1.9     | 2.0     | 2.1     | 1.7      | 1.8      |
|      | Water content (%) after 25° C./50% RH/3 days | 8.7     | 9.2     | 8.5     | 6.9     | 2.0      | 1.9      |

[1] average particle size of hydrophilic spherical silica particles from step (A1)
[2] average particle size of final silica particles

Example 1

A paste mix was prepared by adding 95 wt % of $LiCoO_2$ as positive electrode active material, 2.5 wt % of conductive carbon black (Super-P) as conductive agent, and 2.5 wt % of polyvinylidene fluoride (PVdF) as binder to N-methyl-2-pyrrolidone (NMP) solvent. The hydrophobic spherical silica particles (1) was added to the paste in an amount of 0.1 wt % (calculated as solids) based on the total weight of positive electrode material, completing the paste mix. The paste mix was coated onto an aluminum foil, dried, and compressed to form a positive electrode (shaped form).

Another paste mix was prepared by adding 95 wt % of synthetic graphite as negative electrode active material, 2.5 wt % of conductive carbon black (Super-P) as conductive agent, and 2.5 wt % of PVdF as binder to NMP solvent. The hydrophobic spherical silica particles (1) was added to the paste in an amount of 0.1 wt % (calculated as solids) based on the total weight of negative electrode material, completing the paste mix. The paste mix was coated onto an copper foil, dried, and compressed to form a negative electrode (shaped form).

A separator (Celgard 2400 by Hoechst Celanese Corp.) was interposed between the positive and negative electrodes. EC/EMC electrolyte containing 1 M (mol/L) of $LiP_6$ lithium salt was injected into the separator. In this way, a lithium secondary battery was manufactured.

Example 2

A lithium secondary battery was manufactured as in Example 1 except that hydrophobic spherical silica particles (1) were not added to the positive electrode.

Example 3

A lithium secondary battery was manufactured as in Example 1 except that hydrophobic spherical silica particles (1) were not added to the negative electrode.

Example 4

A lithium secondary battery was manufactured as in Example 1 except that hydrophobic spherical silica particles (2) were used instead of (1).

Example 5

A lithium secondary battery was manufactured as in Example 1 except that hydrophobic spherical silica particles (3) were used instead of (1) in an amount of 2 wt % (calculated as solids) based on the total weight of each of negative and positive electrode materials.

Example 6

A lithium secondary battery was manufactured as in Example 1 except that hydrophobic spherical silica particles (3) were used instead of (1) in an amount of 5 wt % (calculated as solids) based on the total weight of each of negative and positive electrode materials.

Example 7

A lithium secondary battery was manufactured as in Example 1 except that hydrophobic spherical silica particles (4) were used instead of (1) in an amount of 3 wt % (calculated as solids) based on the total weight of each of negative and positive electrode materials.

Comparative Example 1

A lithium secondary battery was manufactured as in Example 1 except that the hydrophobic spherical silica particles were added to neither of the positive and negative electrodes.

Comparative Example 2

A lithium secondary battery was manufactured as in Example 1 except that hydrophobic spherical silica particles (5) were used instead of (1) in an amount of 2 wt % based on the total weight of each of negative and positive electrode materials.

Comparative Example 3

A lithium secondary battery was manufactured as in Example 1 except that hydrophobic spherical silica particles (6) were used instead of (1) in an amount of 2 wt % based on the total weight of each of negative and positive electrode materials.

1. Measurement of Water Content in Electrode

The electrodes prepared in Examples and Comparative Examples were measured for water content using a moisture counter AQ-7 (Hiranuma Sangyo Corp.) according to the Karl Fischer method.

2. Evaluation of High-Temperature Storage

The lithium secondary batteries manufactured in Examples and Comparative Examples were fully charged and stored at 60° C. for 2 weeks. The batteries after storage were measured for capacity. A ratio (percent) of the capacity after storage to the initial capacity is reported in Table 2.

3. Evaluation of Rate Characteristics

The lithium secondary batteries manufactured in Examples and Comparative Examples were charged to 4.2 V. While the batteries were discharged at a current flow of 0.5 C or 5 C, a discharge capacity was measured. A ratio (percent) of the discharge capacity at 0.5 C to the discharge capacity at 5 C is reported in Table 2.

TABLE 2

|  |  | Amount of silica particles in positive electrode (wt %) | Amount of silica particles in negative electrode (wt %) | Water content in positive electrode (ppm) | Water content in negative electrode (ppm) | Post-storage capacity/ initial capacity (%) | 0.5 C capacity/ 5 C capacity (%) |
|---|---|---|---|---|---|---|---|
| Example | 1 | (1) 0.1 | (1) 0.1 | 100 | 50 | 84 | 81 |
|  | 2 | — | (1) 0.1 | 250 | 50 | 83 | 82 |
|  | 3 | (1) 0.1 | — | 100 | 150 | 81 | 83 |
|  | 4 | (2) 0.1 | (2) 0.1 | 95 | 45 | 83 | 81 |
|  | 5 | (3) 2 | (3) 2 | 80 | 40 | 84 | 80 |
|  | 6 | (3) 5 | (3) 5 | 65 | 40 | 84 | 80 |
|  | 7 | (4) 3 | (4) 3 | 90 | 60 | 82 | 79 |
| Comparative Example | 1 | — | — | 550 | 180 | 70 | 83 |
|  | 2 | (5) 2 | (5) 2 | 320 | 130 | 72 | 69 |
|  | 3 | (6) 2 | (6) 2 | 350 | 140 | 71 | 64 |

The hydrophobic spherical silica particles within the scope of the invention are relatively hygroscopic and fully hydrophobic so that when the hydrophobic spherical silica particles within the scope of the invention are added to positive and negative electrodes, the resulting positive and negative electrodes have significantly reduced water contents, as seen from Table 2. The capacity of the battery after high-temperature storage is as high as at least 80% of the initial capacity. The discharge capacity ratio indicative of a ratio of low-current discharge capacity to high-current discharge capacity is also as high as at least 79%. When the hydrophobic spherical silica particles are added to the positive and/or negative electrode materials, water-aided side-reactions in the battery are suppressed even during high-temperature storage whereby capacity characteristics are improved. In contrast, in Comparative Example 1, the positive and negative electrodes have very high water contents, and the battery underwent a significant drop of capacity from the initial capacity after high-temperature storage. In Comparative Examples 2 and 3 using hydrophobic silica particles outside the scope of the invention, the positive and negative electrodes have very high water contents, and the battery underwent a significant drop of capacity from the initial capacity after high-temperature storage.

Japanese Patent Application No. 2013-141591 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method of manufacturing a nonaqueous electrolyte secondary battery having a positive electrode, a negative electrode, a separator interposed between the positive and negative electrodes, and a nonaqueous electrolyte,
    wherein the positive and/or negative electrode is made of an electrode material containing hydrophobic spherical silica particles,
    wherein said hydrophobic spherical silica particles comprise introduced $R^1SiO_{3/2}$ units wherein $R^1$ is a substituted or unsubstituted monovalent hydrocarbon group of 1 to 20 carbon atoms on surfaces of hydrophilic spherical silica particles consisting essentially of $SiO_2$ units, and wherein said hydrophobic spherical silica particles further comprise introduced $R^2{}_3SiO_{1/2}$ units wherein $R^2$ is independently a substituted or unsubstituted monovalent hydrocarbon group of 1 to 6 carbon atoms on the surfaces of the hydrophilic spherical silica particles consisting essentially of $SiO_2$ units having $R^1SiO_{3/2}$ units introduced therein, and
    wherein said hydrophobic spherical silica particles have an average particle size of 5 nm to 1.00 μm, a particle size distribution $D_{90}/D_{10}$ of up to 3, and an average circularity of 0.8 to 1, which method comprises the following steps:
    (A1) forming hydrophilic spherical silica particles, conducting a (A2) first hydrophobic surface treatment with trifunctional silane compound, and conducting a (A3) second hydrophobic surface treatment with monofunctional silane compound, wherein the step (A1) of forming hydrophilic spherical silica particles includes subjecting a tetrafunctional silane compound having the general formula (I):

$$Si(OR^3)_4 \quad (I)$$

wherein $R^3$ is each independently a monovalent hydrocarbon group of 1 to 6 carbon atoms, a partial hydrolyzate thereof or a mixture thereof to hydrolysis and condensation in a mixture of a hydrophilic organic solvent and water in the presence of a basic substance, thereby forming a dispersion of hydrophilic spherical silica particles consisting essentially of $SiO_2$ units in the solvent mixture, the first hydrophobic surface treatment (A2) includes adding a trifunctional silane compound having the general formula (II):

$$R^1Si(OR^4)_3 \quad (II)$$

wherein $R^1$ is a substituted or unsubstituted monovalent hydrocarbon group of 1 to 20 carbon atoms, and $R^4$ is each independently a monovalent hydrocarbon group of 1 to 6 carbon atoms, a partial hydrolyzate thereof or a mixture thereof to the dispersion from step (A1), for conducting surface treatment of the hydrophilic spherical silica particles, thereby obtaining a dispersion of spherical silica particles having $R^1SiO_{3/2}$ units introduced on their surface in the solvent mixture, step (A2) is followed by a concentration step of removing a portion of the hydrophilic organic solvent and water from the dispersion resulting from step (A2), thereby providing a concentrated dispersion (A') containing 15 to 40% by weight of spherical silica particles, and the second hydrophobic surface treatment (A3) includes adding a silazane compound having the general formula (III):

$$R^2_3SiNHSiR^2_3 \quad (III)$$

wherein $R^2$ is each independently a substituted or unsubstituted monovalent hydrocarbon group of 1 to 6 carbon atoms, a monofunctional silane compound having the general formula (IV):

$$R^2_3SiX \quad (IV)$$

wherein $R^2$ is as defined above and X is an OH group or hydrolyzable group, or a mixture thereof to the dispersion from step (A2), for conducting surface treatment of the spherical silica particles having $R^1SiO_{3/2}$ units introduced thereon, thereby introducing $R^2_3SiO_{1/2}$ units on their surface, whereby hydrophobic spherical silica particles are obtained; and (B) incorporating obtained hydrophobic spherical silica particles in positive and/or negative electrode material.

2. The method of manufacturing a nonaqueous electrolyte secondary battery of claim 1,
wherein the positive electrode is made of a positive electrode material containing 0.1 to 5% by weight as solids of the hydrophobic spherical silica particles based on the weight of the positive electrode material, and
wherein the negative electrode is made of a negative electrode material containing 0.1 to 5% by weight as solids of the hydrophobic spherical silica particles based on the weight of the negative electrode material.

3. The method of manufacturing a nonaqueous electrolyte secondary battery of claim 1, wherein the positive electrode comprises positive electrode active material selected from the group consisting of lithium, lithium-containing complex oxides, $NbSe_2$, $TiS_2$, $MoS_2$, $NbS_2$, $ZrS_2$, $VS_2$, $V_2O_5$, $MoO_3$, and $Mg(V_3O_8)_2$.

4. The method of manufacturing a nonaqueous electrolyte secondary battery of claim 1, wherein the negative electrode comprises negative electrode active material selected from the group consisting of non-graphitizable carbon, graphitizable carbon, graphite, pyrolytic carbons, coke, vitreous carbons, fired organic polymers, carbon fibers, active carbon, silicon, silicon oxides of the formula $SiO_x$ wherein $0.5 \leq x < 1.6$, silicon-free metal oxides of the formula $MO_a$ wherein M is Ge, Sn, Pb, Bi, Sb, Zn, In, or Mg and "a" is a positive number of 0.1 to 4, and lithium complex oxides of the formula $LiM_bO_0$ wherein M is Ge, Sn, Pb, Bi, Sb, Zn, In, Mg, or Si, b is a positive number of 0.1 to 4, and c is a positive number of 0.1 to 8.

5. The method of manufacturing a nonaqueous electrolyte secondary battery of claim 1, wherein the separator comprises a porous sheet or nonwoven fabric of polyethylene, polypropylene, or copolymers thereof or an aramid resin.

6. The method of manufacturing a nonaqueous electrolyte secondary battery of claim 1, wherein the nonaqueous electrolyte comprises a salt of an alkali metal, a salt of an alkaline earth metal, or an aluminum salt.

* * * * *